United States Patent
Lee et al.

(10) Patent No.: US 8,711,310 B2
(45) Date of Patent: Apr. 29, 2014

(54) LIQUID CRYSTAL DISPLAY

(75) Inventors: Ho-Jun Lee, Anyang-si (KR); Sang Wook Lee, Seoul (KR); Sung-Jun Kim, Seoul (KR)

(73) Assignee: Samsung Display Co., Ltd. (KR)

( * ) Notice: Subject to any disclaimer, the term of this patent is extended or adjusted under 35 U.S.C. 154(b) by 288 days.

(21) Appl. No.: 13/150,715

(22) Filed: Jun. 1, 2011

(65) Prior Publication Data

US 2012/0212698 A1 Aug. 23, 2012

(30) Foreign Application Priority Data

Feb. 17, 2011 (KR) ........................ 10-2011-0014272

(51) Int. Cl.
*G02F 1/1343* (2006.01)

(52) U.S. Cl.
USPC ........... 349/139; 349/192; 349/138; 349/122; 349/52

(58) Field of Classification Search
CPC ........................ G02F 1/1333; G02F 1/13338
USPC ...................... 349/138, 139, 40, 52, 122, 192
See application file for complete search history.

(56) References Cited

U.S. PATENT DOCUMENTS

| | | | | |
|---|---|---|---|---|
| 6,057,898 | A * | 5/2000 | Itoh et al. .......................... | 349/73 |
| 6,476,897 | B1 | 11/2002 | Watanabe et al. | |
| 6,864,935 | B2 * | 3/2005 | Kim et al. ...................... | 349/129 |
| 7,816,693 | B2 * | 10/2010 | Inoue et al. ...................... | 257/88 |
| 2007/0018585 | A1 * | 1/2007 | Ijzerman et al. ................ | 315/15 |
| 2007/0146598 | A1 * | 6/2007 | Yokokawa et al. ........... | 349/123 |
| 2007/0200995 | A1 * | 8/2007 | Jang .............................. | 349/156 |
| 2008/0137022 | A1 * | 6/2008 | Komeno et al. ............... | 349/153 |
| 2009/0091671 | A1 * | 4/2009 | Tsubata et al. .................. | 349/38 |
| 2010/0060842 | A1 | 3/2010 | Igeta et al. | |
| 2010/0225875 | A1 * | 9/2010 | Wang et al. ................... | 349/160 |
| 2010/0271582 | A1 * | 10/2010 | Yamakawa et al. ........... | 349/138 |

FOREIGN PATENT DOCUMENTS

| | | |
|---|---|---|
| JP | 07311385 A | 11/1995 |
| JP | 08022015 A | 1/1996 |
| JP | 09152620 | 6/1997 |
| JP | 09152620 A | 6/1997 |
| JP | 2000193959 | 7/2000 |
| JP | 2000193959 A | 7/2000 |
| JP | 2000221516 | 8/2000 |
| JP | 2000221516 A | 8/2000 |
| JP | 2003098532 | 4/2003 |
| JP | 2003098532 A | 4/2003 |
| JP | 2004212446 | 7/2004 |

(Continued)

*Primary Examiner* — Edward Glick
*Assistant Examiner* — Sang V Nguyen
(74) *Attorney, Agent, or Firm* — Cantor Colburn LLP (57) ABSTRACT

A liquid crystal display includes a first substrate and a second substrate which face each other and each include a display area and a peripheral area, a liquid crystal layer in the display areas and between the first substrate and the second substrate, and a conductive sealant combining the first substrate and the second substrate. The first substrate includes a common electrode in the display and peripheral areas of the first substrate. The second substrate includes a first and signal lines in the peripheral area of the second substrate, a first insulating layer on the first signal line and the second signal line, and a conductor on the first insulating layer in the peripheral area and connected to the first signal line through a contact hole. The common electrode includes a cutout corresponding to the conductor, and the cutout is at a corner of the display areas.

14 Claims, 6 Drawing Sheets

(56) References Cited

FOREIGN PATENT DOCUMENTS

| | | |
|---|---|---|
| JP | 2004212446 A | 7/2004 |
| JP | 2004295067 | 10/2004 |
| JP | 2004295067 A | 10/2004 |
| JP | 2007248694 | 9/2007 |
| JP | 2007248694 A | 9/2007 |
| JP | 2008009407 | 1/2008 |
| JP | 2008009407 A | 1/2008 |
| JP | 2008009423 | 1/2008 |
| JP | 2008009423 A | 1/2008 |
| JP | 102008009407 A | 1/2008 |
| KR | 1020070056553 A | 6/2007 |
| KR | 1020070065626 A | 6/2007 |
| KR | 1020070069407 A | 7/2007 |
| KR | 100796153 | 1/2008 |
| KR | 100796153 B | 1/2008 |
| KR | 1020080052986 A | 6/2008 |
| KR | 1020090073710 A | 7/2009 |
| KR | 100939221 | 1/2010 |
| KR | 100939221 B | 1/2010 |

\* cited by examiner

LIQUID CRYSTAL DISPLAY

This application claims priority to Korean Patent Application No. 10-2011-0014272 filed on Feb. 17, 2011, and all the benefits accruing therefrom under 35 U.S.C. §119, the entire contents of which are incorporated herein by reference.

BACKGROUND OF THE INVENTION (a) Field of the Invention

The invention relates to a liquid crystal display.

(b) Description of the Related Art

Liquid crystal displays ("LCDs") are one of the most widely used flat panel displays, and an LCD includes a pair of panels provided with field-generating electrodes and a liquid crystal ("LC") layer interposed between the two panels. The LCD displays images by applying voltages to the field-generating electrodes to generate an electric field in the LC layer that determines the orientation of LC molecules therein to adjust polarization of incident light.

The liquid crystal display includes a pixel including a switching element realized by a thin film transistor ("TFT") as a three terminal element, and a display panel including display signal lines such as a gate line and a data line. The TFT functions as a switching element transmitting or blocking a data signal transmitted through the data line to a pixel, according to a gate signal transmitted through the gate line.

The display panel of the liquid crystal display includes a display area formed with the pixel for displaying image signals, and a non-display area excluding the display area. The non-display area is a region required for driving the liquid crystal display. Here, as the size of the liquid crystal display is increased, it is preferable that the display area is maximized and the non-display area is minimized.

Also, a tiled display realized by liquid crystal displays that are arranged in a matrix such as 3×3 or 4×4 matrix has been spotlighted. The tiled display of a large size may be realized by using small liquid crystal displays, and the tiled display device may be applied to various fields.

However, when the width of a bezel as the non-display area disposed between liquid crystal displays is wide, natural connection of the display is difficult. Accordingly, the bezel of the tiled display device must be minimized, and the non-display area of the liquid crystal display must be minimized.

For this, a sealant combining two display panels includes conductive balls having conductivity such that the width of a light blocking member is decreased to minimize the non-display area.

However, the conductive balls included in the sealant are positioned at a region except at a short point such that the upper and lower panels are short-circuited when the sealant is diffused into a driving circuit when forming the sealant.

The above information disclosed in this Background section is only for enhancement of understanding of the background of the invention and therefore it may contain information that does not form the prior art that is already known in this country to a person of ordinary skill in the art.

BRIEF SUMMARY OF THE INVENTION

Exemplary embodiments of the invention provide a liquid crystal display that prevents a short circuit of upper and lower panels due to a conductive ball of a sealant, and prevents diffusion of the sealant that is deviated from a desired position.

An exemplary embodiment of a liquid crystal display according to the invention includes a first substrate and a second substrate which face each other and each include a display area and a peripheral area, a liquid crystal layer in the display areas and between the first substrate and the second substrate, and a conductive sealant combining the first substrate and the second substrate. The first substrate includes a common electrode in the display area and the peripheral area of the first substrate. The second substrate includes a first signal line and a second signal line in the peripheral area of the second substrate, a first insulating layer on the first signal line and the second signal line, and a conductor on the first insulating layer in the peripheral area and connected to the first signal line through a contact hole. The common electrode includes a cutout corresponding to the conductor, and the cutout is at a corner of the display areas.

In an exemplary embodiment, a second insulating layer between the first signal line and the second signal line and including a contact hole may be further included, and the conductor may electrically connect the first signal line and the second signal line through the contact hole of the first insulating layer and the second insulating layer.

In an exemplary embodiment, a thin film transistor in the display area of the second substrate and a pixel electrode connected to the thin film transistor may be further included, and the conductor may include the same material as the pixel electrode.

In an exemplary embodiment, the first signal line and the second signal line may be applied with a common voltage.

Another exemplary embodiment of a liquid crystal display according to the invention includes a first substrate and a second substrate which face each other, a liquid crystal layer between the first substrate and the second substrate, a conductive sealant which combines the first substrate and the second substrate, and at least one of a first barrier layer on the first substrate and overlapping the conductive sealant, and a second barrier layer on the second substrate and overlapping the conductive sealant.

In an exemplary embodiment, the first substrate and the second substrate may each include a display area including a plurality of pixels and a peripheral area including a driving circuit to control the pixels. At least one of a third barrier layer on the first substrate between the display area and the sealant and a fourth barrier layer on the second substrate between the display area and the sealant may be further included.

In an exemplary embodiment, the first barrier layer, the second barrier layer, the third barrier layer, and the fourth barrier layer may have the same width in a first direction.

In an exemplary embodiment, an interval in the first direction between the first barrier layer and the second barrier layer, and an interval in the first direction between the third barrier layer and the fourth barrier layer may be smaller than the width of the first barrier layer, the second barrier layer, the third barrier layer, and the fourth barrier.

In an exemplary embodiment, a spacer maintaining an interval between the first substrate and the second substrate may be further included, and the second barrier layer and the fourth barrier layer may include the same material as the spacer.

In an exemplary embodiment, a width of the second barrier layer and the fourth barrier layer may be smaller than a thickness of the spacer.

In an exemplary embodiment, a color filter on the first substrate or the second substrate may be further included, and the first barrier layer and the third barrier layer may include the same material as the color filter.

In an exemplary embodiment, the upper surfaces of the first barrier layer, the second barrier layer, the third barrier layer, and the fourth barrier layer may include protrusions and depressions.

According to exemplary embodiments of the invention, the common electrode has the cutout such that a short circuit between the upper and lower substrates by conductive balls in the sealant may be reduced or effectively prevented.

Also, the barrier layer is included such that diffusion of the sealant into the display area may be reduced or effectively prevented.

Further, the barrier layer prevents the alignment layer from being diffused into the peripheral area and being met and crumpled by the sealant.

BRIEF DESCRIPTION OF THE DRAWINGS

The above and other features of this disclosure will become more apparent by describing in further detail exemplary embodiments thereof with reference to the accompanying drawings, in which:

FIGS. 6A to 6E are views showing various shapes of alternative exemplary embodiments of a barrier layer according to the invention.

DETAILED DESCRIPTION OF THE INVENTION

The invention will be described more fully hereinafter with reference to the accompanying drawings, in which exemplary embodiments of the invention are shown. As those skilled in the art would realize, the described embodiments may be modified in various different ways, all without departing from the spirit or scope of the invention.

In the drawings, the thickness of layers, films, panels, regions, etc., are exaggerated for clarity. Like reference numerals designate like elements throughout the specification. It will be understood that when an element such as a layer, film, region, or substrate is referred to as being "on" another element, it can be directly on the other element or intervening elements may also be present. In contrast, when an element is referred to as being "directly on" another element, there are no intervening elements present.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the invention.

Spatially relative terms, such as "lower," "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative to the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the invention are described herein with reference to cross-section illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereafter, an exemplary embodiment of a liquid crystal display according to the invention will be described with reference to FIG. 1 to FIG. 7.

Figure 1:
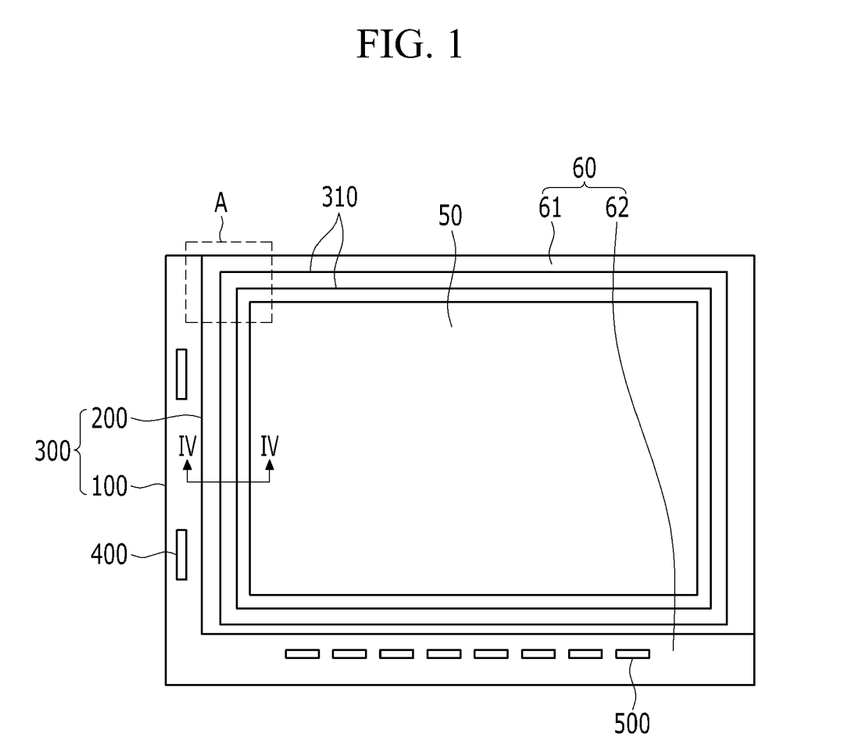
FIG. 1 is a top plan view of an exemplary embodiment of a liquid crystal display according to the invention.

FIG. 1 is a top plan view of an exemplary embodiment of a liquid crystal display according to the invention.

Referring to FIG. 1, a liquid crystal display includes a lower panel 100 and an upper panel 200 facing to each other, and a liquid crystal layer (not shown) interposed therebetween. The lower panel 100 and the upper panel 200 form a liquid crystal panel assembly 300.

In a view of a plane structure, the lower panel 100 and the upper panel 200 include a display area 50 displaying images, and a peripheral area 60 surrounding the display area 50.

The display area 50 includes a plurality of signal lines (not shown), and a plurality of pixels (not shown) connected thereto and arranged in an approximately matrix.

The signal lines are provided in the lower panel 100, and include a plurality of gate lines (not shown) transmitting a gate signal (referred to as "scanning signal"), and a plurality of data lines (not shown) transmitting a data voltage.

Each pixel includes a switching element (not shown) such as a thin film transistor connected to the signal lines, a pixel electrode (not shown) connected to the switching element and in the lower panel 100, a common electrode (not shown) in the upper panel 200, and a liquid crystal layer (not shown)

The pixel electrode receives the data voltage through the switching element. The common electrode is on a whole surface of the upper panel 200 and receives a common voltage Vcom.

If the gate line is applied with the gate signal, the data voltage is applied to the pixel electrode of the lower panel 100 through the data line, and the pixel electrode forms an electric field to the liquid crystal layer along with the common electrode of the upper panel 200 applied with the common voltage. Thus, the degree of polarization of light incident to the liquid crystal layer is changed according to the inclination degree of the liquid crystal molecules of the liquid crystal layer and the change of the polarization is represented as a change of transmittance by a polarizer, and thereby a liquid crystal display displays an image.

The peripheral area 60 includes a first peripheral area 61 in both the lower panel 100 and the upper panel 200, and a second peripheral area 62 in only the upper panel 200 and exposing the lower panel 100. The second peripheral area 62 is disposed around and outside of the first peripheral area 61.

A sealant 310 combining and fixing the lower panel 100 and the upper panel 200, and enclosing the liquid crystal layer is in the first peripheral area 61. The sealant 310 is around a circumference of the display area 50, and may include conductive balls (not shown) having conductivity. The conductive balls are dispersed in a medium for the conductive balls such as an organic material (polymer). The conductive balls may generally be elastic members of a spherical shape, and may be coated by a metal material having conductivity such as gold (Au) or silver (Ag). The size of the conductive balls may be equal to or more than an interval between the lower panel 100 and the upper panel 200, that is, a cell gap. When the size of the conductive balls is greater than the cell gap, the conductive balls have elasticity such that the conductive balls are compressed when a height of the cell gap is reduced if the lower panel 100 and/or the upper panel 200 are pressed.

A gate driver 400 and a data driver 500 are positioned at the second peripheral area 62. The liquid crystal display may include a plurality of the gate drivers 400 and/or a plurality of the data drivers 500. The gate driver 400 is connected to the gate line of the display area 50, and applies gate signals obtained by combining a gate-on voltage Von for turning on a switching element and a gate-off voltage Voff for turning off the switching element to the gate lines. The data driver 500 is connected to the data line of the display area 50 and applies the data voltage to the data lines. The gate driver 400 and the data driver 500 may be directly mounted on the lower panel 100 of the second peripheral area 62 in the form of at least one integrated circuit ("IC") chip, may be mounted on a flexible printed circuit film (not shown) as a tape carrier package ("TCP") type that is attached to the lower panel 100, or may be integrated in the lower panel 100 along with the thin film transistor.

Figure 2:
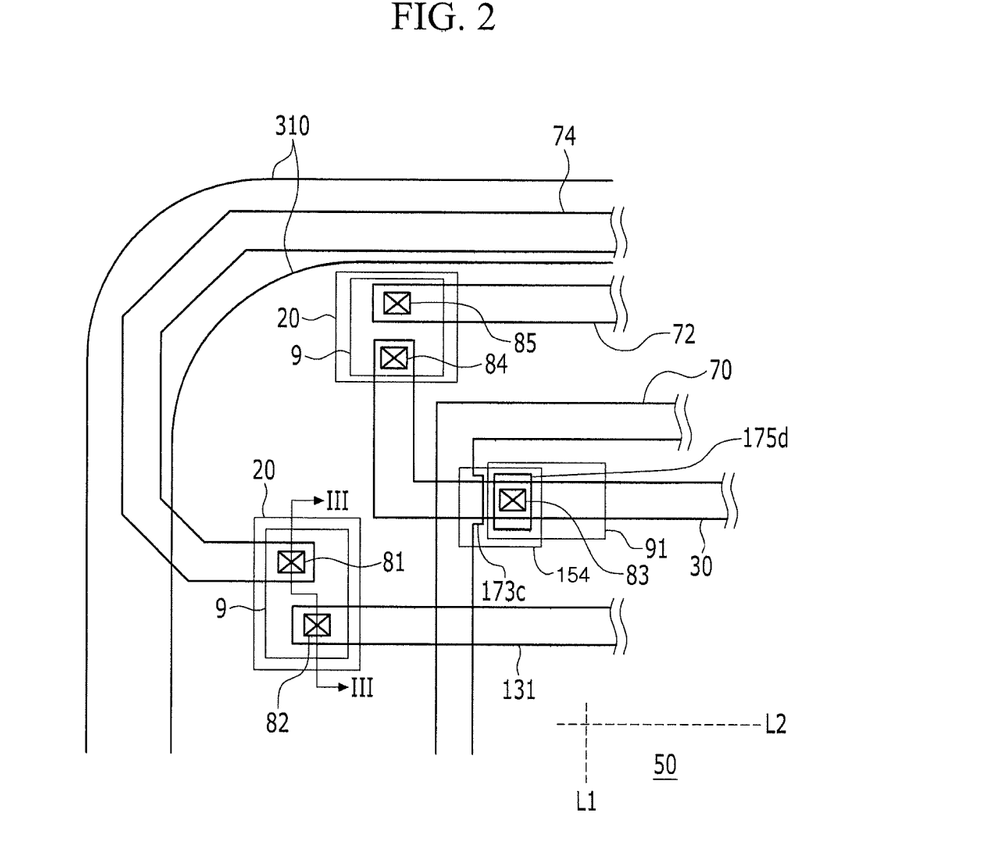
FIG. 2 is an enlarged view of portion A of the liquid crystal display shown in FIG. 1.
Figure 3:
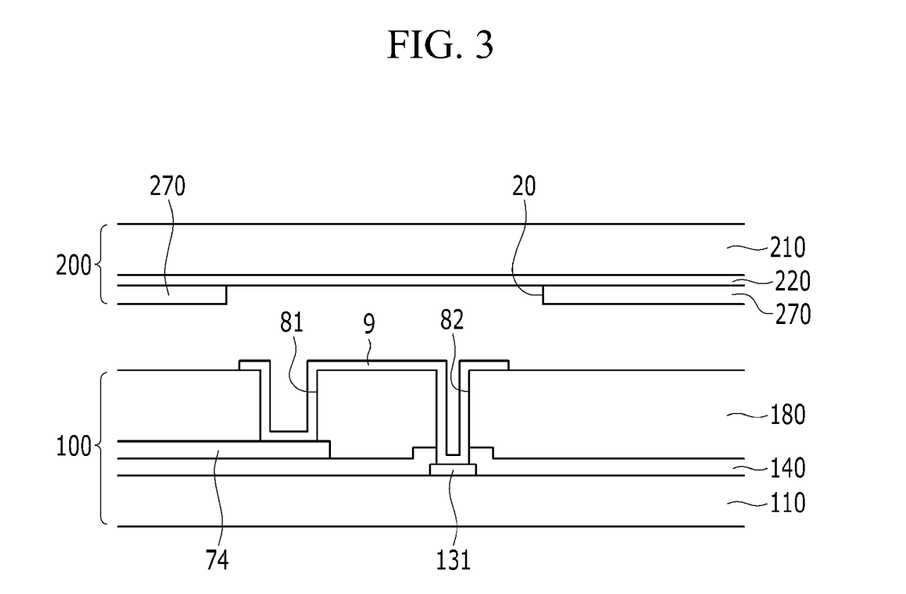
FIG. 3 is a cross-sectional view taken along line III-III of FIG. 2.

FIG. 2 is an enlarged view of portion A of the liquid crystal display shown in FIG. 1, and FIG. 3 is a cross-sectional view taken along line III-III of FIG. 2.

Firstly, referring to FIG. 2 and FIG. 3, to describe the lower panel 100, a first signal line 131 is on a lower substrate 110. The first signal line 131 substantially extends in a transverse direction, and is connected to a storage electrode line forming a storage capacitance in each pixel of FIG. 1.

The first signal line 131 may include a metal including aluminum (Al), silver (Ag), copper (Cu), molybdenum (Mo), chromium (Cr), tantalum (Ta), titanium (Ti), or alloys thereof. The first signal line 131 may be in a same layer and may include the same material as the gate line, of each pixel of FIG. 1.

Referring to FIG. 2, a second signal line 30 is longitudinally extended in the transverse direction and parallel to the first signal line 131 on the lower substrate 110.

The second signal line 30 is used to reduce or effectively prevent damage to a circuit in the liquid crystal display panel due to static electricity in the manufacturing process of the liquid crystal display, and may be applied with the same voltage as the common voltage Vcom or a different voltage from the common voltage Vcom.

Referring to FIG. 2 and FIG. 3, a first insulating layer 140 is on the first signal line 131. The first insulating layer 140 may be a gate insulating layer positioned at the pixel of FIG. 1.

A third signal line 70, a fourth signal line 72, and a fifth signal line 74 are on the first insulating layer 140.

The third signal line 70 may be in the same layer and include the same material as the data line positioned at the pixel of FIG. 1.

The third signal line 70 may be applied with a voltage such as the common voltage Vcom or a predetermined voltage that is different from the common voltage, and includes a protrusion 173*c*. The protrusion 173*c* and a conductor pattern 175*d* positioned within the same layer respectively become a source electrode and a drain electrode of the thin film transistor.

The fourth signal line 72 may be applied with a voltage such as the common voltage or a predetermined voltage that is different from the common voltage, and the fifth signal line 74 may also be applied with a voltage such as the common voltage, thereby forming the storage capacitance of the pixel.

A second insulating layer 180 is on (e.g., overlapping) the third signal line 70, and extends to overlap the fifth signal line 74. The second insulating layer 180 may be a passivation layer positioned at the pixel of FIG. 1. The second insulating layer 180 includes a single layer or multiple layers, including an organic material having a low dielectric ratio of less than 4.0 or an inorganic material such as silicon oxide or silicon nitride.

The second insulating layer 180 includes a contact hole 81 exposing the fifth signal line 74, a contact hole 82 exposing the first signal line 131, a contact hole 83 exposing the conductor pattern 175*d*, a contact hole 84 exposing the second signal line 30, and a contact hole 85 exposing the fourth signal line 72.

A plurality of connecting members 9 and a dummy pixel electrode 91 are on the second insulating layer 180. The connecting members 9 and the dummy pixel electrode 91 may be in the same layer and include the same material as the pixel electrode of the pixel of FIG. 1.

The connecting member 9 electrically connects the fifth signal line 74 and the first signal line 131 through the contact holes 81 and 82, and electrically connects the second signal line 30 and the fourth signal line 72 through the contact holes 84 and 85.

Also, the dummy pixel electrode 91 is electrically connected to the conductor pattern 175*d* through the contact hole 83.

The second signal line 30, the dummy pixel electrode 91, the conductor pattern 175*d*, and the protrusion 173*c* form a dummy thin film transistor along with a semiconductor 154. The dummy thin film transistor to prevent static electricity from flowing into the pixel preferably has the same structure as the thin film transistor of the pixel. Alternatively, the dummy thin film transistor may be a diode.

Next, referring to the upper panel 200, a light blocking member 220 is on an upper substrate 210. The light blocking member 220 to prevent light leakage between the pixels of FIG. 1 is also positioned at the edge of the display area 50, thereby reducing or effectively preventing external light from flowing into the pixel.

The light blocking member 220 positioned outside the display area 50 may be at a portion indicated by dotted lines L1 and L2 of FIG. 2.

A common electrode 270 is positioned on the light blocking member 220. The common electrode 270 may include a transparent conductor such as indium tin oxide ("ITO") and indium zinc oxide ("IZO") on the entire surface of the upper substrate 210.

The common electrode 270 includes a cutout 20, and the cutout 20 is positioned to correspond to the connecting member 9 of the lower panel. As used herein, "correspond" indicates being aligned with, or substantially similar in position, dimension and/or shape. The cutout 20 is a void in the common electrode 270, and may extend completely through a thickness of the common electrode 270 such that the cutout 20 is an enclosed opening solely defined by the common electrode 270.

Referring to FIG. 1, the sealant 310 is positioned at the edge of the display area 50, and it is difficult to control the width of the sealant 310 in the corner of the display area 50, such as during a manufacturing process. Accordingly, the sealant 310 that is positioned at the corner may protrude toward the display area 50. Here, the connecting member 9 and the overlying common electrode 270, or the dummy pixel electrode 191 and the overlying common electrode 270 may be shorted by the conductive balls included in the sealant 310 protruding toward the display area 50.

However, in the exemplary embodiment of the invention, a portion of the common electrode 270 in the region corresponding to the connecting member 9 or the dummy pixel electrode 91 is absent such that the cutout 20 is formed, and thereby short-circuiting of the upper and lower panels may be reduced or effectively prevented.

In an exemplary embodiment of the invention, one connecting member 9 or one dummy pixel electrode 91 is shown, however various driving circuits to control the pixel may be positioned at the corner of the display area. Accordingly, a plurality of connecting members positioned within different layers via the insulating layer interposed therebetween, and connecting various signal lines transmitting several signals may be at the corner of the display area.

An exemplary embodiment of the corner of the display area according to an the invention may be a portion that is divided by extending lines L1 and L2 of the first pixel array or the first pixel row of the display area toward an outer edge of the display panel.

Next, another exemplary embodiment of the invention will be described with reference to FIG. 4 as well as FIG. 1.

Figure 4:
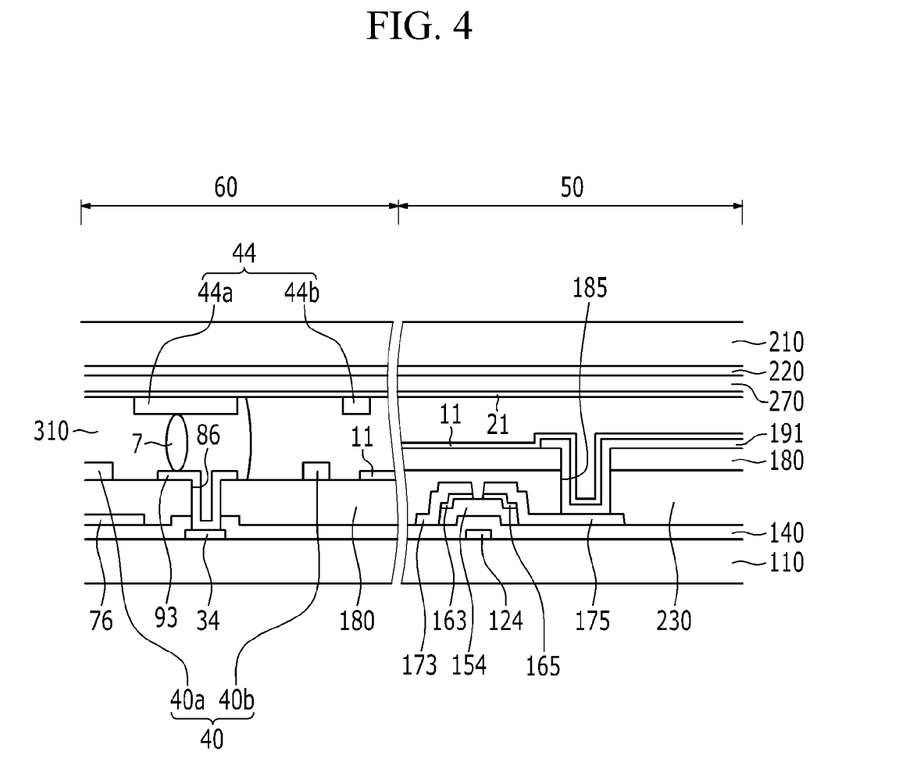
FIG. 4 is a cross-sectional view taken along line IV-IV of FIG. 1.

FIG. 4 is a cross-sectional view taken along line IV-IV of FIG. 1.

Firstly, referring to FIG. 4, the lower panel 100 will be described, and it includes a sixth signal line 34 on the peripheral area 60 of the lower substrate 100. The sixth signal line 34 may be within the same layer and include the same material as the gate line of the pixel.

The sixth signal line 34 may transmit the common voltage Vcom or the predetermined voltage like the above-described first signal line 131, second signal line 30 and third to fifth signal lines 70, 72 and 74, and is connected to the gate line or the data line of the pixel to transmit a scanning signal or an image signal.

Also, a gate electrode 124 is in the display area 50. The gate electrode 124 receives the gate signal from the driving circuit that is positioned in the peripheral area.

The first insulating layer 140 is on the sixth signal line 34, and the first insulating layer 140 may be the gate insulating layer of the thin film transistor disposed on the gate electrode 124.

A plurality of semiconductors 154 are positioned on the first insulating layer 140 of the display area 50. The semiconductor 154 includes amorphous silicon or polysilicon, and overlaps the gate electrode 124.

A pair of ohmic contacts 163 and 165 that are separated from each other and face each other are each on the semiconductor 154. The ohmic contacts 163 and 165 separated from each other define a channel therebetween where the semiconductor 154 is exposed.

A source electrode 173 and a drain electrode 175 are respectively positioned on the ohmic contacts 163 and 165. The ohmic contacts 163 and 165 include amorphous silicon doped with a high concentration of a n-type impurity, thereby reducing contact resistance between the source electrode 173 and the semiconductor 154, and the drain electrode 175 and the semiconductor 154. When the semiconductor 154 includes an oxide semiconductor, the ohmic contacts 163 and 165 may be omitted.

A plurality of seventh signal lines 76 are on the first insulating layer 140 of the peripheral area 60. The seventh signal lines 76 may include the same material as the source electrode 173 and the drain electrode 175.

The seventh signal line 76 may transmit the common voltage Vcom or the predetermined voltage like the above-described first signal line 131, second signal line 30 and third to fifth signal lines 70, 72 and 74, and may be connected to the gate line or the data line of the pixel to transmit the scanning signal or the image signal.

The second insulating layer 180 is on the seventh signal line 76. The second insulating layer 180 covers the semiconductor 154 between the source electrode 173 and the drain electrode 175 to protect the channel of the thin film transistor.

A color filter 230 is on the second insulating layer 180 of the display area 50. The color filter 230 may display one of three primary colors of red, green, and blue, as well as white, and a mixture thereof.

Also, a lower barrier layer 40 is on the second insulating layer 180 of the peripheral area 60. The lower barrier layer 40 may include the same material as the color filter 230, and may include one of three primary colors.

The lower barrier layer 40 encloses the display area 50 like the sealant 310 of FIG. 1. The lower barrier layer 40 includes a first lower barrier layer 40a overlapping the sealant 310, and a second lower barrier layer 40b disposed between the sealant 310 and the display area 50.

A pixel electrode 191 is on the color filter 230 of the display area 50, and a transparent conductor pattern 93 is on the second insulating layer 180 of the peripheral area 60.

The pixel electrode 191 is electrically connected to the drain electrode 175 through a contact hole 185 of the color filter 230 and the second insulating layer 180.

Also, the transparent conductor pattern 93 is electrically connected to the sixth signal line 34 through a contact hole 86 of the second insulating layer and the first insulating layer 140.

The transparent conductor pattern 93 may be a connecting member connecting the sixth signal line 34 to the seventh signal line 76, or may be a dummy pixel electrode of the dummy thin film transistor to prevent static electricity.

An overcoat (not shown) preventing the pigment of the color filter 230 from being diffused into the pixel electrode 191 may be between the pixel electrode 191 and the color filter 230.

An alignment layer 11 is on the pixel electrode 191. A portion of the alignment layer 11 is in the display area 50 and the peripheral area 60. The alignment layer 11 may be in the peripheral area 60 of the display panel by being diffused into the peripheral area 60 when forming the alignment layer 11 in the display area 50. However, in an exemplary embodiment of the invention, if the second lower barrier layer 40b is between the sealant 310 and the display area 50, the second barrier layer 40b reduces or effectively prevents deviation of the alignment layer 11 from the display area 50 and being diffused into the peripheral area 60. Accordingly, diffusion of the alignment layer 11 into the peripheral area 60 and meeting the sealant 310 to be agglomerated may be reduce or effectively prevented.

Next, referring to the upper panel 200, the light blocking member 220 is on the upper substrate 210. The light blocking member 220 is positioned at the circumference of the display area 50 to reduce or effectively prevent flow of the external light into the pixel. Also, the light blocking member 220 may correspond to the data line or the gate line (not shown), and may be at a region corresponding to the thin film transistor.

The common electrode 270 is on the entire surface of the upper substrate 210 and on the light blocking member 220. The common electrode 270 may include the transparent conductor such as ITO or IZO.

An alignment layer 21 is on the common electrode 270 of the upper panel 200.

A plurality of spacers (not shown) to constantly maintain the interval between the upper panel and the lower panel are on the alignment layer 21 of the display area 50, and an upper barrier layer 44 including the same material as the spacers is in the peripheral area 60.

The upper barrier layer 44 has substantially the same shape as the lower barrier layer 40 and encloses the display area 50. The upper barrier layer 44, like the lower barrier layer 40, includes a first upper barrier layer 44a overlapping the sealant 310, and a second upper barrier layer 44b positioned between the sealant 310 and the display area 50.

In an exemplary embodiment, the upper barrier layer 44 may be simultaneously formed with the spacers by using a slit or a semi-transparent layer. A thickness of the spacer in a first direction perpendicular to the upper substrate 210 is greater than a thickness of the lower and upper barrier layers 40 and 44.

In the exemplary embodiment of the invention, the first lower barrier layer 40a and the first upper barrier layer 44a overlap the sealant 310, and although conductive balls 7 of the sealant 310 are positioned on the transparent conductor pattern 93, as shown in FIG. 4, even if the common electrode 270 does not include the cutout 20, a short circuit between the common electrode 270 of the upper panel 200 and the transparent conductor pattern 93 of the lower panel 100 is not generated.

The barrier layer is described in detail with reference to FIG. 5 to FIG. 7.

Figure 5:
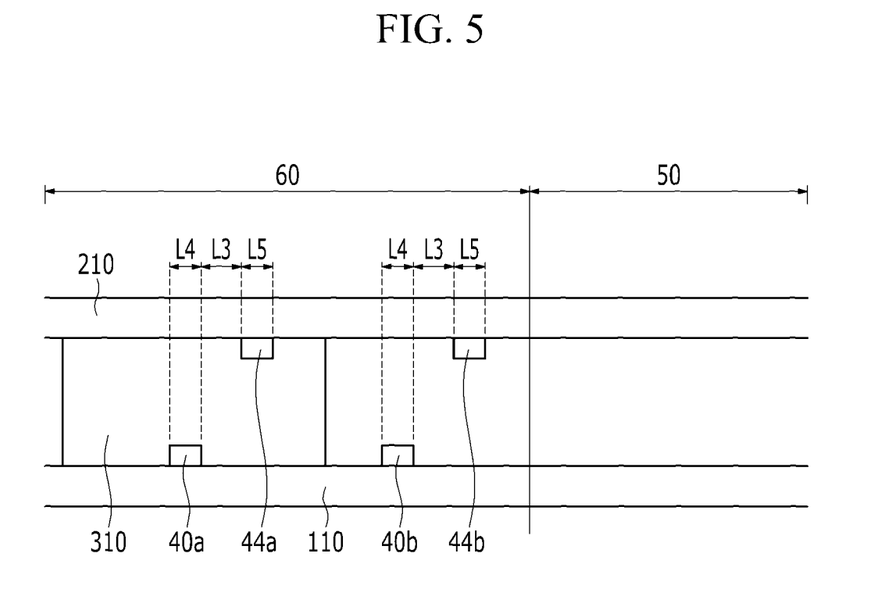
FIG. 5 is a cross-sectional view of another exemplary embodiment of a liquid crystal display including a barrier layer according to the invention.
Figure 6:
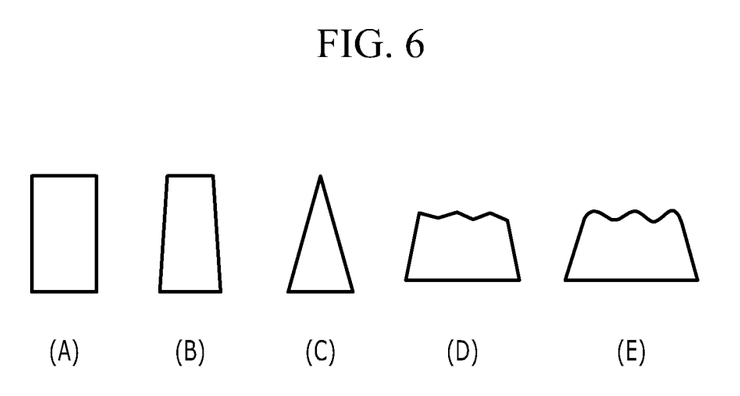
Figure 7:
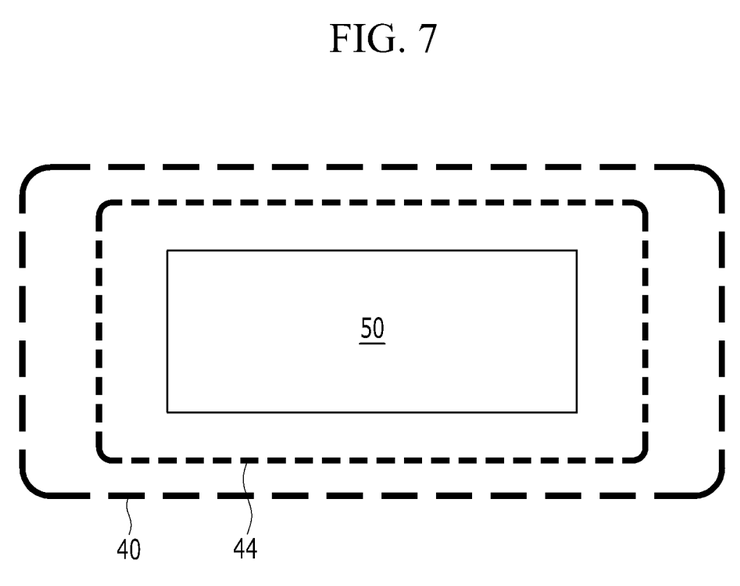
FIG. 7 is a schematic view showing another exemplary embodiment of a plane pattern of a barrier layer according to the invention.

FIG. 5 is a cross-sectional view of another exemplary embodiment a liquid crystal display including a barrier layer according to the invention, FIGS. 6A to 6E are view showing various shapes of alternative exemplary embodiments of a barrier layer according to the invention, and FIG. 7 is a schematic view showing a plane pattern of another exemplary embodiment of a barrier layer according to the invention.

Referring to FIG. 5, the upper barrier layer 44 and the lower barrier layer 40 may have a width L5 and L4 in a first direction, respectively, of about 0.03 micrometer (μm) to about 0.15 μm. A distance L3 in the first direction between the two barrier layers 40 and 44 may be about 0.05 μm. The widths L4 and L5 thereof, respectively, and the distance L3 between two barrier layers may be varied if necessary.

In one exemplary embodiment, the first lower barrier layer 40a and the first upper barrier layer 44a are respectively positioned at a position bisecting a width in the first direction of the sealant 310 and toward the display area 50 from the position bisecting the width of the sealant 310.

In one exemplary embodiment, the second lower barrier layer 40b and the second upper barrier layer 44b are approximately positioned at the position bisecting a distance between the sealant 310 and the display area 50.

The upper barrier layer 44 and the lower barrier layer 40 may have various cross-sectional shapes as shown in FIG. 6.

Referring to FIGS. 6A to 6C, the cross-sections of the upper and lower barrier layers 44 and 40 may substantially be polygons such as a triangle, a quadrangle, or a trapezoid. Also, referring to FIGS. 6D and 6E, an upper surface of the barrier layers 44 and 40 may have protrusions and depressions such that the movement of the sealant 310 and the diffusion of the alignment layer 11 may be reduced or effectively prevented.

In the above exemplary embodiment, the barrier layers 44 and 40 are each a single unitary indivisible looped curve, however the barrier layers 44 and 40 may have a broken or divided shape as shown in FIG. 7. That is, the each of the barrier layers 44 and 40 may be selectively formed according to the diffusion degree of the alignment layer 11 and the sealant 310.

In the above description, the color filter 230 is positioned on the lower substrate 110, however the color filter 230 may be positioned on the upper substrate 210 and the spacer may be positioned on the lower substrate. Accordingly, the lower barrier layer 40 may include the same material as the spacer, and the upper barrier 44 layer may include the same material as the color filter 230.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A liquid crystal display comprising:
   a first substrate and a second substrate which face each other, and each including a display area and a peripheral area;
   the first substrate comprising a common electrode in the display area and in the peripheral area of the first substrate,
   the second substrate comprising:
      a first signal line and a second signal line in the peripheral area of the second substrate;
      a first insulating layer on the first signal line and the second signal line; and
      a first conductor on the first insulating layer in the peripheral area of the second substrate and connected to the first signal line through a first contact hole;
   a liquid crystal layer in the display area of the first substrate and the second substrate, and between the first substrate and the second substrate; and a conductive sealant between the first substrate and the second substrate, wherein the common electrode of the first substrate includes a cutout overlapping the first conductor of the second substrate, and the cutout is at a corner of the display area.

2. The liquid crystal display of claim 1, further comprising a second insulating layer between the first signal line and the second signal line, and including a second contact hole, and the first conductor electrically connects the first signal line and the second signal line through the first contact hole of the first insulating layer and the second contact hole of the second insulating layer.

3. The liquid crystal display of claim 1, wherein the second substrate further comprises:
   a thin film transistor in the display area of the second substrate; and
   a pixel electrode connected to the thin film transistor, and the first conductor includes the same material as the pixel electrode.

4. The liquid crystal display of claim 1, wherein the first signal line and the second signal line are applied with a common voltage.

5. The liquid crystal display of claim 1,
wherein the second substrate further comprises:
   a third signal line and a fourth signal line different from the first and second signal lines, in the peripheral area of the second substrate and overlapping the conductive sealant; and
   a second conductor on the first insulating layer in the peripheral area of the second substrate, connected to the third signal line through a third contact hole and overlapping the conductive sealant; and further comprising at least one of a first barrier layer on the first substrate and overlapping the conductive sealant and a second barrier layer on the second substrate and overlapping the conductive sealant, wherein the respective barrier layer is between the second conductor and the common electrode.

6. A liquid crystal display comprising:
a first substrate and a second substrate facing each other and each including a display area and a peripheral area;
the second substrate further comprising:
   a common electrode in the display area and in the peripheral area,
   a first signal line in the peripheral area and overlapping the conductive sealant,
   a first insulating layer on the first signal line; and
   a first conductor on the first insulating layer in the peripheral area, connected to the first signal line through a first contact hole and overlapping the conductive sealant;
a liquid crystal layer between the first substrate and the second substrate;

a conductive sealant which combines the first substrate and the second substrate to each other; and at least one of a first barrier layer on the first substrate and overlapping the conductive sealant and a second barrier layer on the second substrate and overlapping the conductive sealant, wherein the respective barrier layer is between the first conductor and the common electrode in the peripheral area of the first and second substrates.

7. The liquid crystal display of claim 6, further comprising:
a plurality of pixels defined in the display areas,
a driving circuit which is in the peripheral areas and controls the pixels, and
at least one of a third barrier layer on the first substrate between the display area and the sealant and a fourth barrier layer on the second substrate between the display area and the conductive sealant.

8. The liquid crystal display of claim 7, wherein
the first barrier layer, the second barrier layer, the third barrier layer, and the fourth barrier layer have the same width in a first direction.

9. The liquid crystal display of claim 8, wherein
an interval in the first direction between the first barrier layer and the second barrier layer, and an interval in the first direction between the third barrier layer and the fourth barrier layer are smaller than the width.

10. The liquid crystal display of claim 7, further comprising
a spacer maintaining an interval between the first substrate and the second substrate, and
the second barrier layer and the fourth barrier layer include the same material as the spacer.

11. The liquid crystal display of claim 10, wherein
thicknesses of the second barrier layer and the fourth barrier layer are smaller than a thickness of the spacer.

12. The liquid crystal display of claim 7, further comprising
a color filter on the first substrate or the second substrate, and
the first barrier layer and the third barrier layer include the same material as the color filter.

13. The liquid crystal display of claim 7, wherein
upper surfaces of the first barrier layer, the second barrier layer, the third barrier layer, and the fourth barrier layer include protrusions and depressions.

14. The liquid crystal display of claim 6, wherein
the second substrate further comprises:
   a second signal line in the peripheral area and not overlapping the conductive sealant; and
   a second conductor on the first insulating layer in the peripheral area, connected to the second signal line through a second contact hole and not overlapping the conductive sealant,
a void is defined in the common electrode of the first substrate and overlaps the second conductor of the second substrate, and
the cutout is at a corner of the display areas.

* * * * *